UNITED STATES PATENT OFFICE.

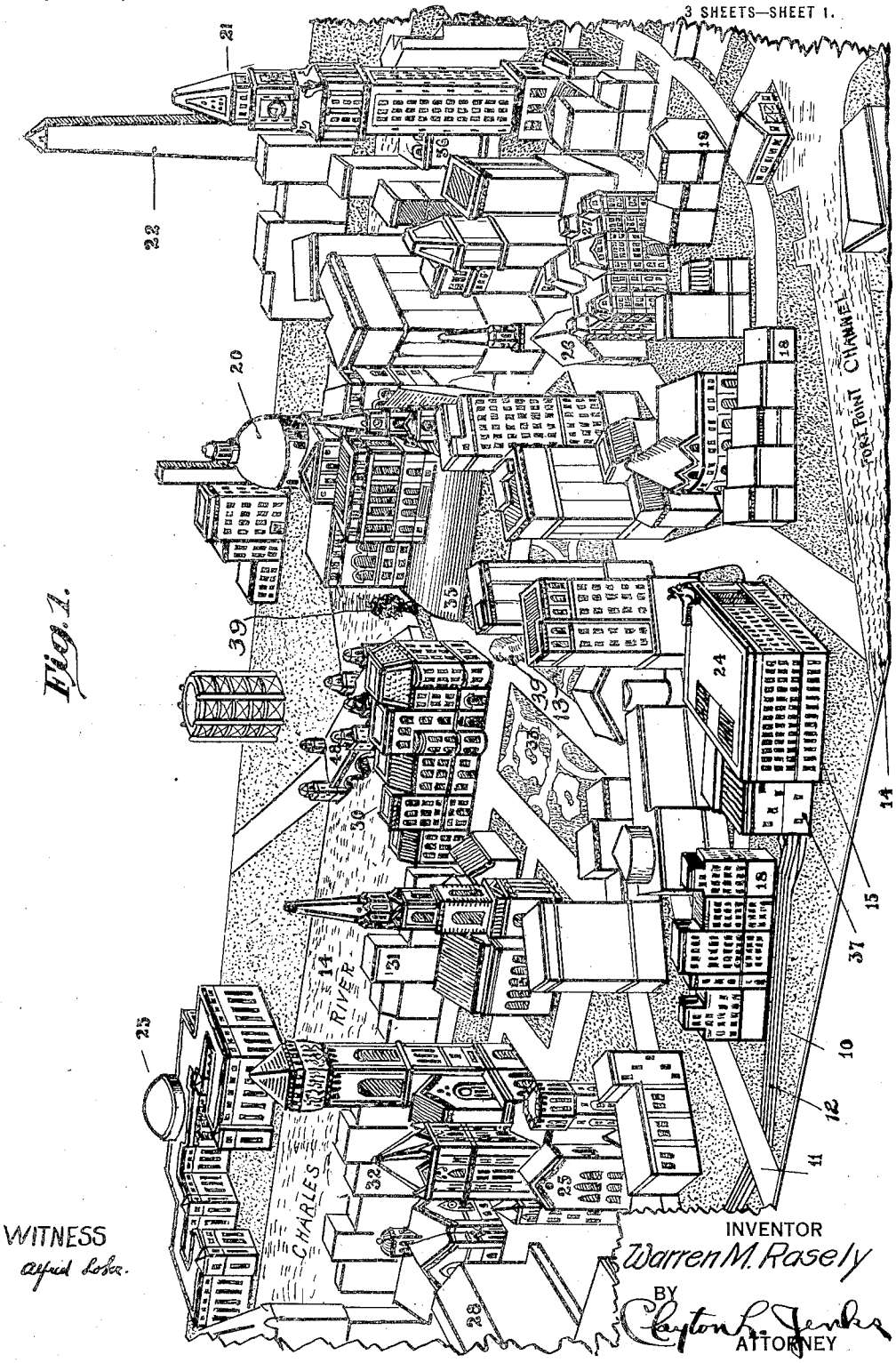

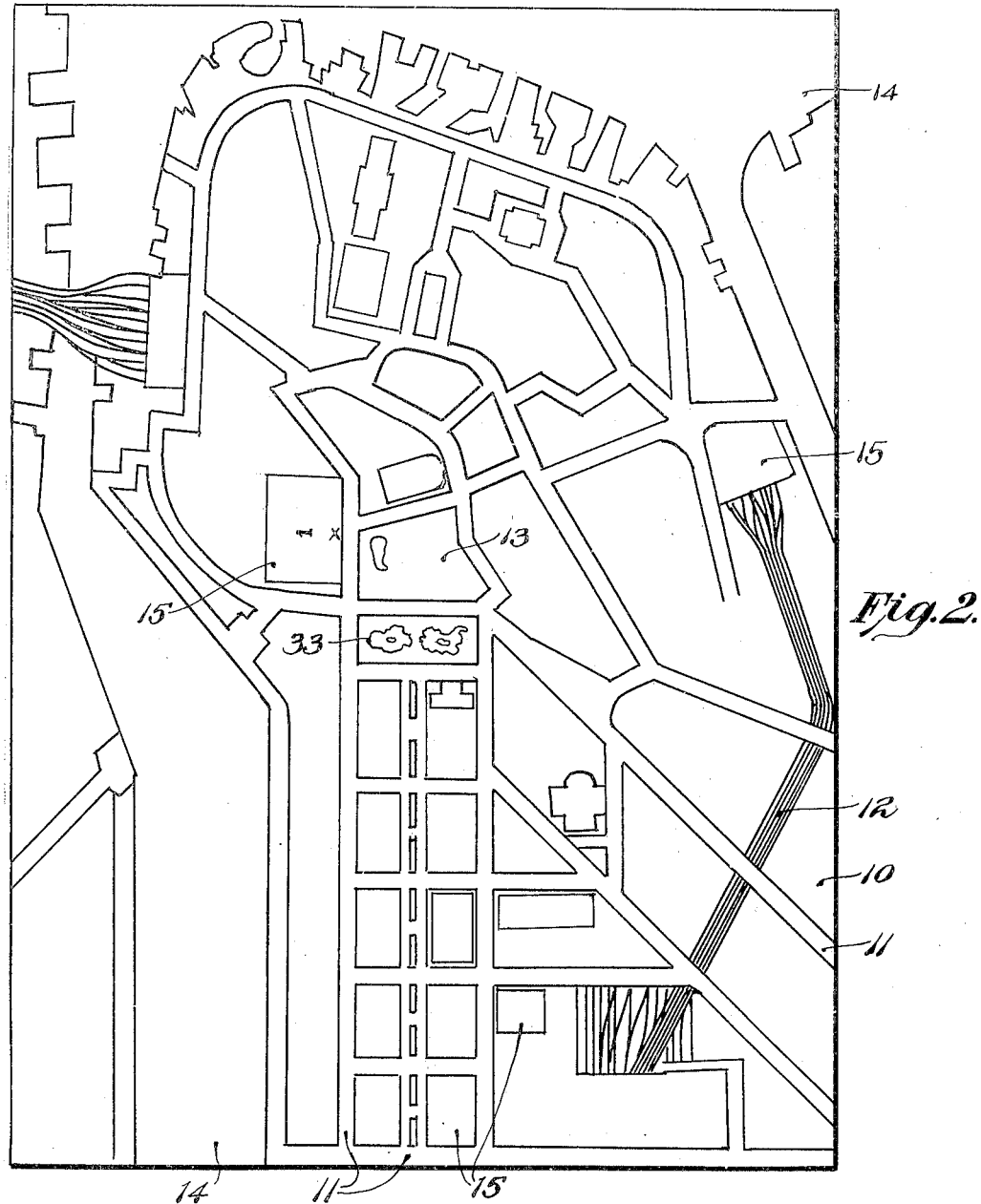
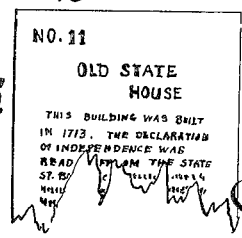

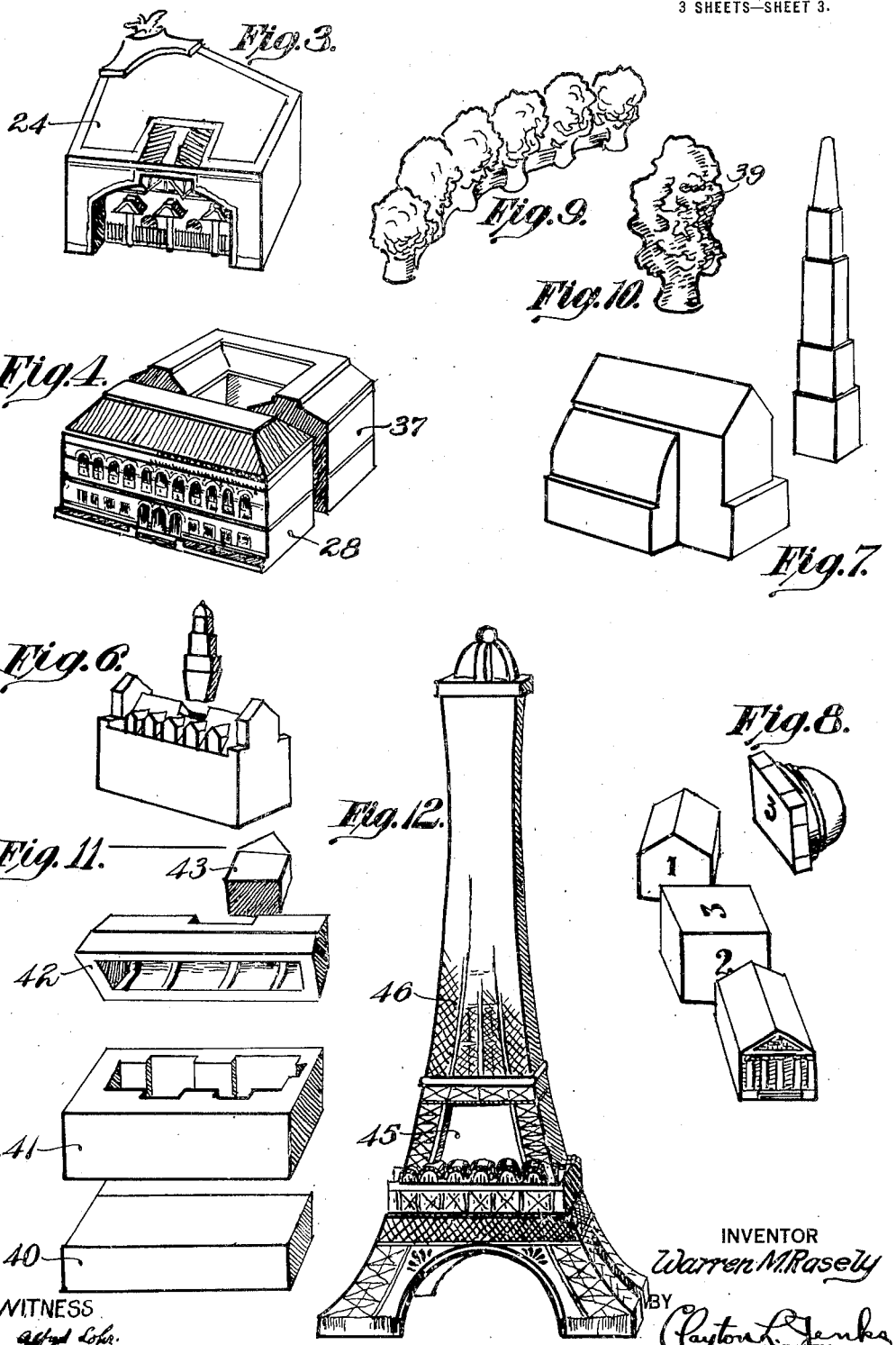

WARREN M. RASELY, OF WORCESTER, MASSACHUSETTS.

EDUCATIONAL TOY.

1,393,163.  Specification of Letters Patent.  Patented Oct. 11, 1921.

Application filed February 3, 1919. Serial No. 274,793.

*To all whom it may concern:*

Be it known that I, WARREN M. RASELY, a citizen of the United States of America, residing at Worcester, in the county of Worcester and State of Massachusetts, have invented certain new and useful Improvements in Educational Toys, of which the following is a full, clear, and exact specification.

My invention relates to educational appliances for entertaining children and instructing them as to the construction or layout of a given city, the nature of its principal buildings and points of interest and the historical associations connected therewith, and more particularly to an educational toy comprising building blocks and a ground plan associated together to convey an impressionistic view of any particular city or associated objects of popular interest.

The present stage of our educational system is such that while there is a great demand for teaching children about the largest civic centers of a country, yet no adequate means has been presented for conveying to their minds any proper understanding of the nature of these great cities unless they can visit them. Maps of the cities do not convey any large meaning to these untrained minds and photographs of actual scenes or of buildings or other points of interest do not tie together the various objects which may be historically, civically, commercially and otherwise associated in the reality. Moreover these flat pictures convey no idea of perspective or distances or the relations of the buildings or objects shown in one illustration with those shown in some other picture. This applies equally well to adults, since people with more mature minds are not ordinarily able to put together isolated pictures representing different scenes in a given city and thereby acquire an idea as to the layout and general scheme of the place. For example, pictures of the public buildings of Boston and of the parks and of the streets can convey little idea to the average mind of the relations of these buildings with one another and the park system and of the general beauty of the city itself.

Children have always been interested in games which involve building operations, and particularly in building towns or cities, and numerous attempts have been made to satisfy this desire of children by providing, for example, cardboard articles which may be folded together and built to the shape of houses. These houses which are of conventional design are then placed upon a larger cardboard or ground plan to build up a toy village or town. However, this is not educational and is unsatisfactory even as a toy, because the architectural designs are simple and of common form and do not represent any place or city in the reality or as actually or impressionistically seen by a tourist.

Architects have made models of portions of cities and of buildings of the cities, these being for building purposes or in order to illustrate the actual or proposed construction of a given place, but these do not lend themselves to educational purposes because they are ordinarily made in a permanent, rigid form which can not be knocked down and set up again, and which stand there merely as a painting in perspective, as it were. A child would obviously quickly lose interest in such a construction since he could not handle it and play with it, and he therefore would learn little as to the nature and construction of the place. Moreover, it is obviously impossible to make an architect's model to reproduce a large city such as Boston or New York or Washington, comprising thousands of buildings, on such a scale as to render it usable by teachers in the schoolroom or for children to play with. Such a model could not be constructed except at a fabulous cost and would require an immense room to hold it in a set-up condition. Moreover, an exact reproduction of a city would include all the sordid features of the town, the undesirable localities and the buildings which are better unseen, and the better parts and points of interest would be lost in their surroundings.

It is accordingly an object of my invention to overcome these difficulties and to provide an educational toy which will give a child an idea of the construction of a city or other group of associated objects, and more particularly give an impressionistic representation of the more important portions, buildings, streets, parks and other objects of interest in a given and actual city such as a tourist might get upon casually viewing the city; which will suggest the general appearance of the important buildings in the city with or without reference to the lesser details of construction and design; which will furnish means for informing one as to the historic, civic, artistic, commercial, political and sentimental associations of the parts of the city; which will give a child amusement in building a toy city to represent a known place and permit him to vary the arrangements of the buildings indefinitely to suit his own ideals or notions as to how a city should appear, and which will in fact suggest a given city without actually being a miniature model thereof.

With this and other objects in view, as will be apparent from the following disclosure, my invention resides in the combination of parts set forth in the specification and covered by the claims appended hereto.

In order that this invention may be readily understood, I have illustrated in the drawings in simplified form an assembly of units adapted to represent the city of Boston.

Figure 1 is a perspective view, partly broken away and partly incomplete as to details, showing the main buildings and a few filler blocks associated together on a ground plan of the principal streets, waterways and railroads of the lower portion of Boston;

Fig. 2 illustrates incompletely what is termed the ground plan of this device, but a portion of the building plots and other features being shown;

Fig. 3 is a perspective view of a block illustrating one special feature of the South Station;

Fig. 4 shows two ways in which the public library may be represented;

Fig. 5 represents a portion of a card which is one of a series intended to give historical and other data of interest relative to the city being portrayed;

Fig. 6 is a view of the old State House showing the tower as detachable;

Fig. 7 shows how a block, representing a church for example, may be sub-divided;

Fig. 8 illustrates how a given building, such as the Quincy Market, may be built by the child out of separate blocks adapted to be fitted together;

Fig. 9 illustrates a grouping of trees adapted to represent a park or parkway;

Fig. 10 represents a single tree;

Fig. 11 represents a barn made of detachable parts, which are hollowed and so constructed as to represent the interior of a building; and Fig. 12 is a representation of the Eiffel Tower, showing how a fabricated steel structure, such as a tower or a bridge, may be represented.

The present invention contemplates an impressionistic portrayal of a city or other group of associated objects by setting up on a suitable ground plan a set of movable blocks representing the important buildings or other objects of interest. This invention may be embodied in exceedingly elaborate productions, or in a more simple form as illustrated in the drawings. Referring to Figs. 1 and 2, I propose to convey to a child or other person an idea of the make-up of the city of Boston, for example, by means of a schematic ground plan 10 which has suitably marked thereon some of the principal streets 11, railroads 12, parks 13, waterways 14 and sites 15 of important buildings or any other objects of interest. This plan may consist of a map printed on suitable material, illustrated in Fig. 1 as a cardboard base. To represent the buildings, I provide separate blocks made of a suitable composition of matter such as artificial stone, which are adapted to fit in designated places on the ground plan or map. These blocks are preferably so designed, as to contour, outlines, color schemes, markings and proportions, that they convey an impressionistic idea of such buildings similar to that obtained by a tourist casually viewing this particular building on a trip through the city.

The commonplace objects and the undesirable portions of a city need not be illustrated in this toy, hence the ground plan is so laid out and the buildings proportioned thereto that only a portion of the principal objects of interest are shown. The unimportant streets and the uninteresting parts of the city which are not needed in the toy are either entirely left out or are merely indicated in a diagrammatical way on the plan as by suitable color schemes, pictures, etc., or they may be represented in part by means of secondary blocks properly located on the ground plan. Owing to the enormous number of buildings in Boston, it is not feasible to show each in the toy, nor can the buildings be made to scale corresponding with the ratio of the size of the ground plan to the actual size of the city; hence the blocks are exaggerated, modified or distorted in their proportions relative to the actual buildings in order to produce the best optical effects. A given city building which may actually occupy but a small portion of a city square, in this scheme of things will ordinarily cover a much larger area, perhaps equivalent to several squares on an actual map, and take the place of unimportant office buildings, stores and dwellings which may surround the principal building. To permit such prominence being given to any building, I distort the ground plan to fit it in with the building space deemed allotable to a given block. For example, I have illustrated Boston in Fig. 2 as being but a few blocks wide and containing but a score or so of streets, the others being entirely omitted. This is permissible since a tourist who visits a particular city does not go up and down all of the streets and does not ordinarily see the unimportant ones, hence he will not miss them in this toy. Of course it is feasible to show more of the streets by making the ground plan larger than as proportioned in the drawings, in which case I preferably use therewith a larger number of what I have termed filler blocks, as will be described. A block may be made for each of the important buildings in the city, or one block may serve for several buildings or even for several city squares, in order that the device may be simple in its construction and not be filled up with representations of numerous unimportant parts of a city.

While it is feasible to build this toy city by using only those blocks which represent the more important buildings, and my invention embraces this idea within its scope, yet to prevent destroying the illusion that one has before him a miniature representation of a city, I find it desirable to utilize filler blocks 18 to provide a background for the main buildings and to give the toy the appearance and form of a city with its streets and groups of associated blocks.

In order that the drawing may not appear too complicated, but few filler blocks have been shown in Fig. 1, however they are preferably used more freely than as illustrated. Since these may all be made alike or according to a few different standard types, it is entirely feasible, and within the spirit of my invention, to fill in the various spaces on the ground plan between the more important buildings with these blocks as one may desire. For this purpose, I provide in addition to the main blocks an extra set of filler blocks of various dimensions, shapes and appearances. It is obvious that on a casual trip to the city of Boston, one will carry away with him no impression as to the less interesting parts of town, except possibly that of commonplace sordidness, hence a child may fill in these portions of the town as he sees fit and obtain a satisfactory impression of the assemblage. It of course is preferable that each section of the city be filled with its characteristic type of block. For example one would use brick loft buildings of about six stories high around the South Station, while the Back Bay section will be filled with residences.

As shown in Fig. 1, the important buildings, such as the State House 20, Custom House Tower 21, Bunker Hill Monument 22, Massachusetts Institute of Technology 23, South Station 24, Trinity Church 25, Old South Meeting House 26, the Post Office 27 and the Boston Public Library 28 are represented by separate blocks. On the other hand, the buildings along Beacon street are grouped together in one or more blocks 30, 31 and 32. One seeing block 30 from the Public Gardens 33 as illustrated will be satisfied that the general appearance agrees with what his memory recalls. It is desirable that in designing such blocks one keep rather truthfully to the general appearance of buildings which occupy important positions, although they separately are of little relative importance. While various buildings are actually interposed between those facing Beacon street and the Charles river, yet in this toy these blocks 30, 31 and 32 are preferably made to cover the whole distance between Beacon street and the river. In order not to convey a false impression to one viewing them from the rear, the rear sides of these blocks are made to look somewhat as the buildings appear from across the river, hence one block represents on opposite faces entirely different buildings.

It obviously is not feasible to give all the details and outlines of a building as elaborate as the State House, for example, nor is it desirable in the simple types of toy to illustrate all the topographical contours of the city. To serve the latter purpose, we may provide a separate base block 35 for prominent buildings such as the State House 20, and thereby make it conspicuous above other buildings and suggest the fact that it is located on a hill. The facial design of the State House and similar buildings is so brought out by markings, colors, embossings, etc., as to suggest to the mind the more important and conspicuous features. If the building is sufficiently large and prominent in itself, the details may be elaborated as much as feasible. If, on the other hand, the building is small and not at all prominent in its location, and yet of great importance historically or otherwise, such as Faneuil Hall 36 or the old State House (Fig. 5), its more important features may be brought out or even accentuated and the minor details completely ignored. One may also exaggerate this building in size relative to its neighbor in order to give it due prominence. It should be noted that it is not the faithful portrayal of the building design that is needed, but merely the impressionistic effect. For example, the South Station 24 in the actuality is a large building with an immense train shed back of it. This train shed may be illustrated, as in Fig. 1, by means of a separate block 37 adapted to be placed in the rear of the main building. As shown in Fig. 3, the separate block may be omitted and the rear of the main building block may be slightly recessed and provided with projections and various markings which suggest to the observer a rear view of the train sheds as seen from the tracks. It is to be noted that in the toy the train sheds are not in correct proportions, but are merely shown in relief to suggest depth and perspective. Again, in a small and inexpensive toy having but few parts, the Public Library may be represented by the single block 28, as shown in Figs. 1 and 4, or in a more elaborate production this may be indicated by the two blocks 28 and 37 forming a hollow square, or by a single solid block adapted to represent the whole building. The front face of the building, shown in Figs. 1 and 4, is the one ordinarily seen by the tourist and he does not know, unless he has visited the inside of the building, what its actual shape may be, hence this simpler representation will be sufficiently satisfactory provided the front face of the building and the parts normally seen are sufficiently truthful to call the building to mind.

In order that the blocks may be properly located on the ground plan, I may adopt various schemes, as for example a building site or plot 15 may be marked on the ground plan corresponding in shape with the bottom of a given block and the block and this space correspondingly numbered, the markings being suitable to insure the block facing in the right direction. For example, the numerals 1 are placed on the bottom of the State House and its site and an X may be used to indicate the front of the building. If desired, one may supply with the toy a map of the streets and building sites or a photograph of the town as actually set up or a map bearing photographs of the buildings properly located thereon, whereby a child may learn to place the buildings on the ground plan in accordance therewith.

Since the child should become acquainted with the historical, sentimental and other values of these buildings and sections of the city, I provide descriptive matter thereof, as for example by means of booklets or cards as illustrated in Fig. 5, each bearing thereon suitable data, such as the name of the object being described and interesting facts about it. Each card may, of course, be suitably tied to the ground plan and the given building by numbers or other indicia.

The blocks making up this toy may be constructed of various materials and by suitable processes. In order that the more fragile materials may be used or to give a child amusement in constructing the buildings, I may make portions of the buildings, such as projecting parts, detachable, as illustrated for example in Fig. 6, according to which the tower of the old State House may be removed from the main block for packing away in a box and may be again set in proper place on the top of the building as desired. In this instance, I provide a depression in the top of the building into which a projecting portion of the tower fits. Other suitable means for connecting these parts may obviously be utilized. As illustrated in Fig. 7, a church steeple and the part of the building immediately below it may be entirely detachable from the rest of the church. As shown in Fig. 8 a building may be made up of separate blocks suitably marked as by the numerals 1, 2 and 3, so that the child is put to some ingenuity as well as pleasure in building up the completed structure by placing the blocks together according to their markings. In certain instances, I provide special blocks adapted to be placed on other buildings to represent elevator towers, water-tanks and ordinary bits of construction as a child may wish to locate them in order to give the toy a further appearance of reality and to obviate the necessity for the manufacturer adding these more expensive details to the blocks. To illustrate the parks and separate trees, I utilize a conventional form representing a grouping of trees, such as shown in Fig. 9, which may be located as designated on the ground plan, or as the child may see fit to give the city a further appearance of beauty. Separate trees 39, as illustrated in Figs. 1 and 10, may be added wherever space is found. Other blocks representing people, automobiles, cars, etc., will also give the toy a more civic appearance.

Certain buildings have characteristic interior designs. If desired to portray these, I may utilize the construction shown in Fig. 11, which illustrates a barn of a type well known in eastern Pennsylvania. Here the base 40 is narrower than the main body of the barn 41 which overhangs this base on one side. The interior of the barn is so formed as to illustrate haylofts, horse stalls, etc., as desired, and provisions may be made for peopling the interior of buildings with pigmy images. The roof 42 and tower 43 of this barn are shown detachable in order that the child may see the interior of the building and have the pleasure of building it up.

In order to illustrate hollow or structural steel designs, such as found in the Eiffel Tower, I may, as illustrated in Fig. 12, make a large portion of the block solid and provide grooves or depression in the faces, as illustrated in 45, which in coöperation with line markings 46 on the tower will convey the idea of structural steel or a fabricated metal building. This type of design is particularly applicable to bridges, as illustrated by the Harvard Bridge 48 in Fig. 1, and to the train sheds of the South Station, as shown in Fig. 3.

Various other modifications within the scope of my invention will be apparent in view of the above disclosure and my claims are to be construed broadly as covering a toy reproduction not only of civic centers in general but also of other groups of associated buildings or objects such as found in natural and rural scenes or the ruins of the Hun devastated cities of Belgium and France or a group of objects portraying war scenes, including cantonments, supply stations, factories, hospitals, first-aid stations, trenches, dugouts, wire entanglements, tanks, guns, airplanes, soldiers, etc.

Having described my invention, what I claim as new and desire to secure by Letters Patent, is:

1. An educational toy comprising a set of blocks impressionistically representing in miniature prominent buildings of a given city or other associated objects of interest without being architectural models thereof, which are adapted to be grouped according to a ground plan to suggest said city or association of objects.

2. An educational toy comprising a set of blocks, impressionistically representing principal buildings in a given city and a base member having a plan indicated thereon whereby said blocks may be assembled relative to the plan to suggest said city without forming a miniature architectural model thereof.

3. An educational toy comprising a set of primary blocks impressionistically representing only a portion of the principal buildings in a given section of an actual city, secondary blocks representing common types of buildings and a base member having principal streets of said city section and building sites indicated thereon in such an arrangement that the primary blocks may be grouped thereon in approximately correct positions with the secondary blocks interspersed at will therebetween to suggest said city sections without forming a miniature architectural model thereof.

4. An educational toy comprising a base member having indicated thereon a ground plan of building sites and streets, railroads, parks or other outlines which suggest without mapping a given city, various unimportant streets interspersed between the principal streets being omitted and the principal building sites approximating the correct positions for the buildings, as shown by a map of the city, a set of primary blocks impressionistically representing only a portion of the principal buildings of the city and secondary blocks representing common types of buildings, said primary blocks being locatable on the ground plan in positions indicated by the building sites marked therefor and the secondary blocks being locatable in vacant spaces along the streets between the principal buildings as suits the fancy of the builder of the toy city.

5. An educational toy comprising a set of blocks representing impressionistically but in exaggerated proportions a part of the prominent buildings in a given city and a base having streets and building sites indicated thereon in such arrangement and of such dimensions as to associate the building blocks with the streets running between them to suggest a portion of said city without being a miniature architectural model thereof, said blocks occupying proportionately a larger area on said base than do the actual buildings in the real city.

6. An educational toy comprising a set of blocks designed to convey an impressionistic representation of principal buildings of a given city, said blocks being exaggerated in size and shape as compared with the originals, and a base member having indicated thereon the approximate locations of said buildings in the city and the principal streets and other city outlines approximating but modified from an actual map of the city to compensate for the shapes and sizes of the building blocks, said blocks being adapted to be assembled on the base member to suggest a miniature representation of the given city in its principal features without forming an architectural model thereof.

7. An educational toy comprising blocks impressionistically representing principal buildings in a given city, other blocks representing common types of city squares and a ground plan member having indicated thereon streets and other fixed features of interest to suggest but not actually form a map of said city and building sites suitably identified relative to the blocks to locate the latter correctly on the plan, said blocks being exaggerated in size and occupying larger areas than would actual models of the same city buildings located on a map of the same size as the plan, said plan having such streets, parks and railroads indicated thereon as may be located between the sites of the building blocks to furnish proper settings for the buildings, the plan and blocks suggesting the given city but not constituting an actual architectural model of the city in miniature.

8. An educational toy comprising the combination of an assemblage of associated movable blocks giving an impressionistic representation but not an architectural model of important features of a city or other group of objects of interest with means carrying descriptive matter identifying each block and giving the historical, political, geographical or other data of interest concerning the object which the block represents.

9. An educational toy comprising a set of blocks impressionistically representing principal buildings in a given city, a base having streets and building sites indicated thereon for grouping the blocks to suggest said city without forming an architectural model thereof and means carrying descriptive matter identifying each block and describing historical, sentimental or other associations of the actual building represented.

Signed at Worcester, Massachusetts, this 1st day of Feb., 1919.

WARREN M. RASELY.